US006869459B2

(12) United States Patent
Maryamchik et al.

(10) Patent No.: US 6,869,459 B2
(45) Date of Patent: Mar. 22, 2005

(54) IMPACT TYPE PARTICLE SEPARATOR MADE OF MUTUALLY INVERTED U-SHAPED ELEMENTS

(75) Inventors: Mikhail Maryamchik, Copley Township, Summit County, OH (US); Gary L. Anderson, Duncansville, PA (US); Jeffrey J. Hahn, Ebensburg, PA (US); Edwin L. Collins, III, Albany, NY (US); Timothy F. Connors, Watervliet, NY (US); Jeffrey J. Bolebruch, Gloversville, NY (US)

(73) Assignee: The Babcock & Wilcox Company, New Orleans, LA (US)

( * ) Notice: Subject to any disclaimer, the term of this patent is extended or adjusted under 35 U.S.C. 154(b) by 52 days.

(21) Appl. No.: 10/447,688

(22) Filed: May 29, 2003

(65) Prior Publication Data

US 2004/0250521 A1 Dec. 16, 2004

(51) Int. Cl.⁷ ................................................ B01D 45/08
(52) U.S. Cl. .......................... 55/434.4; 55/444; 55/465; 110/216; 110/245; 122/4 D
(58) Field of Search ............................... 55/434.4, 444, 55/465; 110/216, 245; 122/4 D

(56) References Cited

U.S. PATENT DOCUMENTS

| 4,891,052 A | | 1/1990 | Belin et al. |
| 4,951,611 A | * | 8/1990 | Abdulally et al. ........... 122/4 D |
| 4,992,085 A | | 2/1991 | Belin et al. |
| 5,025,755 A | * | 6/1991 | Eickvonder et al. ........ 122/4 D |
| 5,064,621 A | * | 11/1991 | Uyama et al. ............... 422/144 |
| 5,343,830 A | | 9/1994 | Alexander et al. |
| 5,378,253 A | | 1/1995 | Daum et al. |
| 5,435,820 A | | 7/1995 | Daum et al. |
| 5,799,593 A | | 9/1998 | Belin et al. |
| 5,809,940 A | | 9/1998 | James et al. |
| 6,322,603 B1 | | 11/2001 | Walker |
| 6,454,824 B1 | | 9/2002 | Maryamchik et al. |
| 6,500,221 B2 | | 12/2002 | Walker et al. |

* cited by examiner

Primary Examiner—Robert A. Hopkins
(74) Attorney, Agent, or Firm—Eric Marich

(57) ABSTRACT

Apparatus for separating solids from flue gas in a circulating fluidized bed (CFB) boiler comprises plural vertical, impact type particle separators made of a plurality of hung elements which are supported from at least one cooled support tube. The plurality of hung elements cooperate with one another at adjacent ends thereof to form a collecting channel which opens toward a flow of flue gas along the length of the support tube. Each hung element includes two mutually inverted U-shaped parts; the first U-shaped part opens towards the oncoming flow of flue gas, the second U-shaped part embraces the support tube, and the first U-shaped part is shifted relative to the second U-shaped part by some fraction of a height of the hung element. The hung elements may be made of metal or ceramic.

7 Claims, 2 Drawing Sheets

A-A

IMPACT TYPE PARTICLE SEPARATOR MADE OF MUTUALLY INVERTED U-SHAPED ELEMENTS

FIELD AND BACKGROUND OF THE INVENTION

The present invention relates, in general, to the field of circulating fluidized bed (CFB) boilers and, in particular, to improved impact type particle separator constructions comprised of individual impact type particle separator elements.

CFB boiler systems are known and used in the production of steam for industrial processes and/or electric power generation. See, for example, U.S. Pat. Nos. 5,799,593, 4,992,085, and 4,891,052 to Belin et al.; U.S. Pat. No. 5,809,940 to James et al.; U.S. Pat. Nos. 5,378,253 and 5,435,820 to Daum et al.; and U.S. Pat. No. 5,343,830 to Alexander et al. In CFB reactors, reacting and non-reacting solids are entrained within the reactor enclosure by the upward gas flow which carries solids to the exit at the upper portion of the reactor where the solids are separated by impact type particle separators. The impact type particle separators are placed in staggered arrays to present a path which may be navigated by the gas stream, but not the entrained particles. The collected solids are returned to the bottom of the reactor. One CFB boiler arrangement uses a plurality of impact type particle separators (or concave impingement members or U-beams) at the furnace exit to separate particles from the flue gas. While these separators can have a variety of configurations, they are commonly referred to as U-beams because they most often have a U-shaped configuration in cross-section.

When applied to a CFB boiler, a plurality of such impact type particle separators are supported within the furnace enclosure and extend vertically in at least two rows across the furnace exit opening, with collected particles falling unobstructed and unchanneled underneath the collecting members along the rear enclosure wall. The gap between each adjacent pair of U-beams in one row is aligned with a U-beam in a preceding or following row of U-beams to present a tortuous path for the flue gas/solids to navigate. The U-beams in each row collect and remove particles from the flow of flue gas/solids, while the flue gas stream continues to flow around and through the U-beam array.

These types of collection elements are generally relatively long in comparison to their width and depth. The shape of the collection elements is usually dictated by two considerations: namely, the collection efficiency of the U-beams themselves and the ability of the U-beams to be self-supporting. When these elements are used, they are generally placed at the furnace exit and not cooled. Their placement at the furnace outlet is to protect the downstream heating surfaces from erosion by solid particles. Thus, the U-beams are exposed to the high temperatures of the flowing stream of flue gas/solids, and the materials used for the U-beams must be sufficiently temperature resistant to provide adequate support and resistance to damage.

Long, self-supporting stainless steel plate channels have been successfully used in CFB boilers for the primary solids collector, but the "creep" strength of the commercially available and suitable alloys limits the length of the collection elements.

By breaking up the long collection channel into short segments, the required strength of each short segment is much less than for the long channel due to the series of intermittent supports and the small amount of weight of any individual segment or element.

Collection elements which are cooled or supported off a cooled structure are known. See, for example, U.S. Pat. Nos. 6,322,603 B1 to Walker, U.S. Pat. No. 6,500,221 B1 to Walker et al., and U.S. Pat. No. 6,454,824 B1 to Maryamchik et al., the texts of which are hereby incorporated by reference as though fully set forth herein. These collection elements are well-suited to the environment and task of separating solids particles from flue gas, and are easier to maintain or repair than conventional U-beams comprised of self-supporting stainless steel plate channels.

SUMMARY OF THE INVENTION

The present invention simplifies the assembly and disassembly process of such impact type particle separators, thus reducing the time and cost required for inspection and maintenance of same. As will be seen in the following description, each of the impact type particle separators is comprised of a plurality of individual impact type particle separator elements which may be mounted on or removed from its associated support, preferably a cooled support tube, without disturbing other individual impact type particle separator elements forming the same impact type particle separator. Further, each individual element can be easily locked in the assembled position to prevent its accidental disassembly during operation.

While the impact type particle separators are typically U-beams, the particle collecting portion facing the oncoming flow of flue gas particles and entrained solids can also be formed into W-, E-, V- or other shapes. Such impact type particle separators find particular use in CFB boilers or reactors.

Accordingly, one aspect of the present invention is drawn to an apparatus for separating solids from a flow of flue gas in a CFB boiler. The apparatus comprises a plurality of vertical, impact type particle separators located within the CFB. The impact type particle separators are adjacently positioned and horizontally spaced from one another in a plurality of staggered rows. Each impact type particle separator includes at least one vertical cooled support tube for conveying a cooling medium therethrough, and a plurality of hung elements which are supported from the at least one support tube. The plurality of hung elements cooperate with one another at adjacent ends thereof to form a collecting channel which opens toward the flow of flue gas along the length of the support tube. Each hung element includes two mutually inverted U-shaped parts; the first U-shaped part open towards the oncoming flow of flue gas and the second U-shaped part embracing the support tube, and the first U-shaped part is shifted relative to the second U-shaped part by some fraction of a height of the hung element.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process. Similarly, the term U-beam is used in the following discussion for the sake of convenience, and is meant to refer broadly to any type of concave impingement members or impact type particle separators used to collect and remove particles from a particle laden flue gas. Particularly, the particle collecting portion of the impact type particle separators facing the oncoming flow of flue gas particles and entrained solids may be U-shaped, V-shaped, E-shaped, W-shaped, or any other shape as long as they have a concave or cupped surface which is presented to the oncoming flow of flue gas and entrained particles which will enable the members to collect and remove particles from the flue gas. For a general description of CFB reactors, the reader may refer to the aforementioned U.S. Pat. No. 5,343,830 to Alexander et al., the text of which is hereby incorporated by reference as though filly set forth herein.

Figure 1:
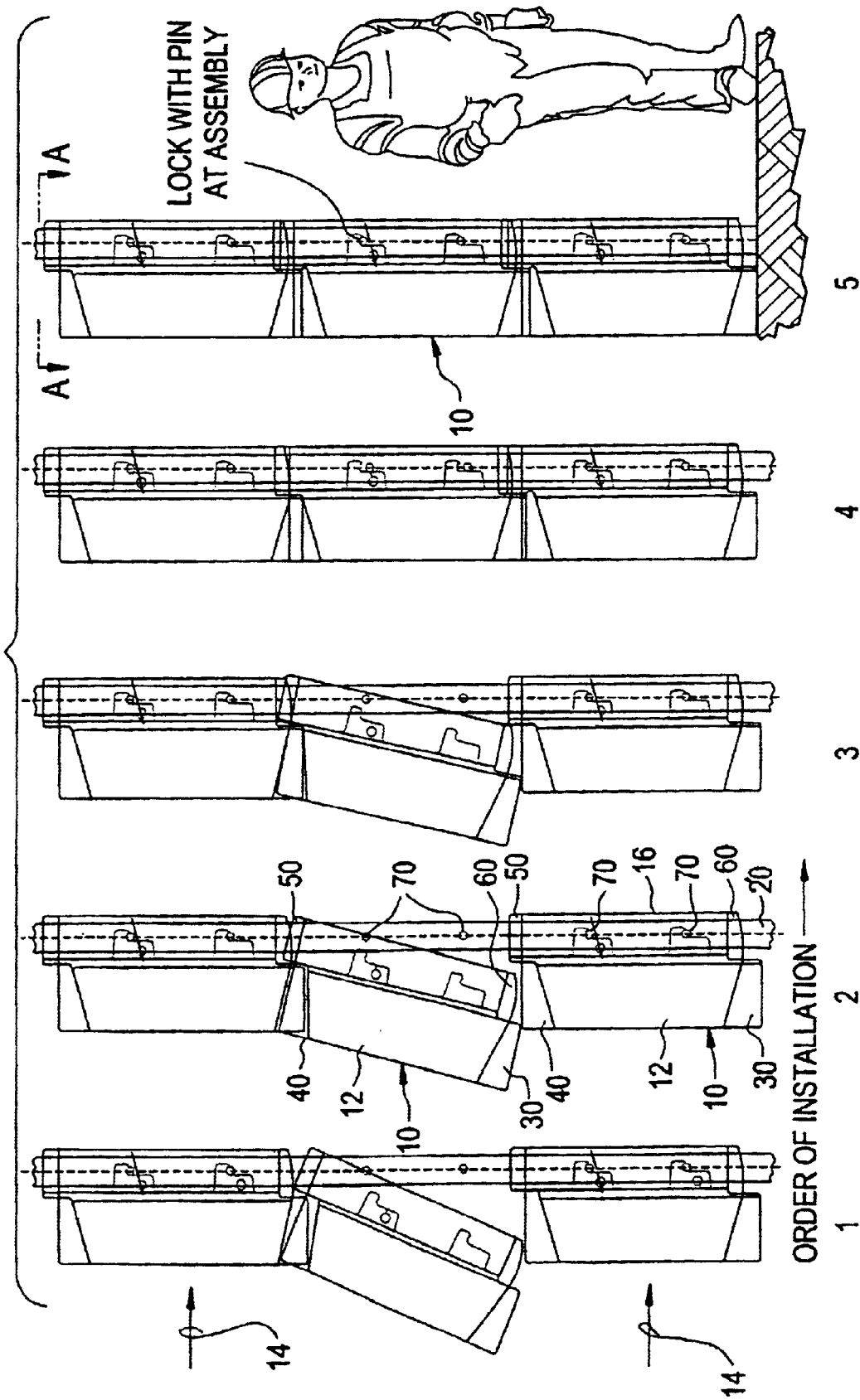
FIG. 1 is a series of sectional side view illustrations of how an individual impact type particle separator element according to the present invention can be installed on a cooled support tube, in between two other individual impact type particle separator elements which are already installed on the tube.
Figure 2:
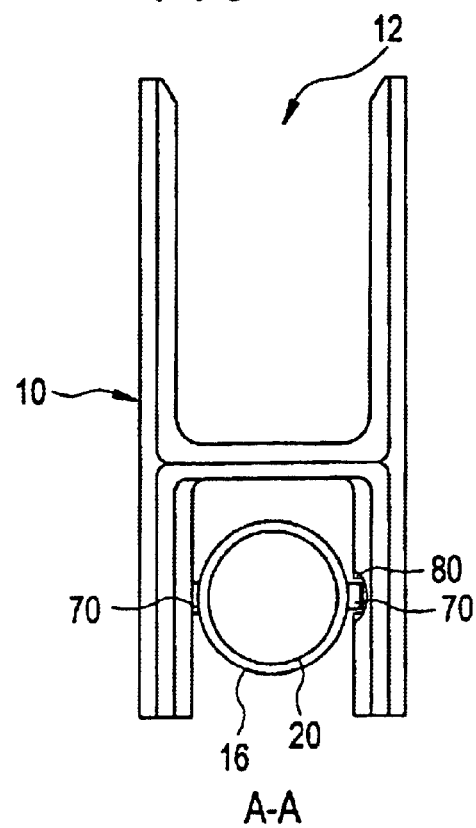
FIG. 2 is a plan view of an individual impact type particle separator element illustrated in FIG. 1, viewed in the direction of arrows A—A of FIG. 1.

Referring now to the drawings, in which like reference numerals are used to refer to the same or functionally similar elements throughout the several drawings, FIG. 1 is a series of sectional side view illustrations of how an individual impact type particle separator element 10 according to the present invention can be installed on a cooled support tube 20, in between two other individual impact type particle separator elements 10 which are already installed on the tube 20. FIG. 2 shows a plan view of an individual impact type particle separator element illustrated in FIG. 1, viewed in the direction of arrows A—A of FIG. 1. Preferably, each individual impact type particle separator element 10 (hereinafter, element 10) comprises two mutually inverted U-shaped parts (i.e., the bottom of the "U" of each is back-to-back), with one (the first) U-shaped part 12 open to the oncoming flow of flue gas and entrained particles 14, and another (the second) U-shaped part 16 embracing the tube 20. As shown, the first U-shaped part 12 is "shifted" relative to the second U-shaped part 16 by some fraction of the overall height of the element 10.

In order to form an uninterrupted impact type particle separator (U-beam) collecting channel which prevents solids particles from escaping between the elements 10, a lower end 30 of the first U-shaped part 12 of a given element 10 in the assembled position is inserted into an upper end 40 of the corresponding part 12 of a lower adjacent element 10. In addition, to prevent solids accumulation in the second part 16 of the elements 10, and also to provide for ease of assembly, an upper end 50 of the second U-shaped part 16 of a given element 10 in the assembled position is inserted into a lower end 60 of the corresponding part 16 of an upper adjacent element 10. This is accomplished by making the walls of the upper end 40 of the first U-shaped part 12 thinned from an inside region of the element 10, while the walls of the lower end 30 of the first U-shaped part 12 are thinned from an outside region of the element 10. Similarly, the walls of the upper end 50 of the second U-shaped part 16 are thinned from the outside region of the element 10, and the walls of the lower end 60 of the second U-shaped part 16 are thinned from the inside region of the element 10.

Each element 10 is preferably supported on the associated tube 20 by means of support pins 70 attached, such as by welding, to opposite sides of the tube 20. While at least one pair of pins 70 is preferred to support each element 10, two pairs of support pins 70, spaced vertically from one another, may be employed for each element 10 to provide a more stable arrangement. The second part 16 of each element 10 is advantageously provided with an indent 80 on an inside portion of the side walls forming the second part 16 which cooperate with the pins 70 provided on the tube 20, allowing each element 10 to hang from the one or more pairs of pins 70.

As illustrated in FIG. 1, installation of each individual element 10 proceeds sequentially as shown in the series of illustrations or stages numbered 1 through 5. In order to remove any element 10 off of the support tube 20, the element 10 should first be lifted from its resting position on the support pins 70, moving from stage 5 to stage 4 as shown in FIG. 1. This is followed by rotating the element 10, moving from stage 4 through stage 1, which results in complete disassembly of the element 10 from the tube 20. To facilitate the assembly and disassembly process, while still providing the aforementioned cooperation of the ends of the adjacent elements 10, the first U-shaped part 12 of a given element 10 is shifted lower than the second U-shaped part 16 of the same element 10.

Figure 3:
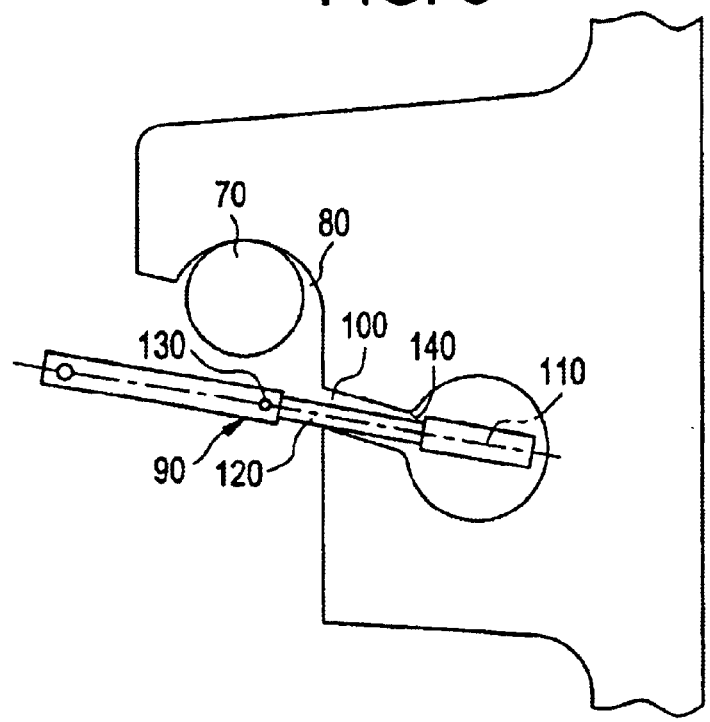
FIG. 3 is a sectional side view of an individual impact type particle separator element illustrating that portion thereof which can engage a pin provided on the cooled support tube to permit the individual element to be hung from the tube.

Since disassembly will not occur unless a given element 10 is lifted off its associated support pins 70, preventing such vertical movement or lifting secures the assembly of an uninterrupted impact type particle separator (U-beam) collecting channel. Such vertical movement or lifting is prevented by means of a metal locking pin 90 which is inserted into a hole 100 provided in the body of the element 10, just below the indent 80. This structure is illustrated in FIG. 3, where it will be seen that if any attempt to lift the element 10 with the locking pin 90 in place, the locking pin 90 will be pressed against the support pin 70, thereby preventing the indent 80 from disengaging with the support pin 70.

Accidental falling of the locking pin 90 out of the hole 100 is prevented by both the shape and weight distribution of the locking pin 90. A head 110 of the locking pin 90 in the "locked" position is fully passed through the hole 100. The head 110 has a diameter which is larger than that of a body portion 120 of the locking pin 90. The locking pin 90 has a center of gravity 130 which is located outside (beyond) the hole 100, thus securing such a position of the locking pin 90 within the hole 100 such that moving the locking pin 90 out of the hole 100 would be prevented by the step change in diameter of the locking pin 90 formed between the head 110 and the body 120 pressing against an edge 140 of the hole 100. It will thus be seen that the only way to take the locking pin 90 out of the hole 100 is to manually position the locking pin 90 coaxial with the hole 100 and then remove the locking pin 90.

Various materials may be employed for the individual U-beam elements 10, including metal or ceramics.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving circulating fluidized bed reactors or combustors, or to the replacement, repair or modification of existing circulating fluidized bed reactors or combustors. In some embodiments of the invention, certain features of the invention may sometimes be used to advantage without a corresponding use of the other features. Accordingly, all such changes and embodiments properly fall within the scope of the following claims.

We claim:

1. An apparatus for separating solids from a flow of flue gas in a circulating fluidized bed (CFB) boiler, comprising:
    a plurality of vertical, impact type particle separators located within the CFB, the impact type particle separators being adjacently positioned and horizontally spaced from one another in a plurality of staggered rows, each impact type particle separator including at least one vertical cooled support tube for conveying a cooling medium therethrough, and a plurality of hung elements which are supported from the at least one support tube, the plurality of hung elements cooperating with one another at adjacent ends thereof to form a collecting channel which opens toward the flow of flue gas along the length of the support tube; and
    wherein each hung element includes two mutually inverted U-shaped parts, the first U-shaped part open towards the oncoming flow of flue gas and the second U-shaped part embracing the support tube, and wherein the first U-shaped part is shifted relative to the second U-shaped part by some fraction of a height of the hung element.

2. The apparatus according to claim 1, wherein the first U-shaped part is shifted lower relative to the second U-shaped part.

3. The apparatus according to claim 2, wherein walls of an upper end of the first U-shaped part are thinned from an inside region of the hung element, walls of a lower end of the first U-shaped part are thinned from an outside region of the hung element, walls of an upper end of the second U-shaped part are thinned from the outside region of the hung element, and walls of a lower end of the second U-shaped part are thinned from the inside region of the hung element.

4. The apparatus according to claim 1, wherein the at least one support tube has at least one pair of support pins for each hung element, the pins in each pair being attached to opposite sides of the tube, and wherein the second U-shaped part has indents formed on an inside portion of the side walls for engaging the at least one pair of support pins provided on the tube to allow each hung element to hang from the at least one pair of support pins.

5. The apparatus according to claim 4, wherein each hung element is provided with a hole located just below the indents for the at least one pair of support pins and a locking pin inserted into the hole to prevent disengagement of the indents from the at least one pair of support pins.

6. The apparatus according to claim 5, wherein the locking pin is longer than the hole in which it is received, and is provided with a head portion which in a locked position passes fully through the hole, the head portion having a larger diameter than a body portion of the locking pin which is located within the hole in the locked position, and wherein the locking pin has a center of gravity located outside (beyond) the hole when the locking pin is in the locked position.

7. The apparatus according to claim 1, wherein the hung element is made of one of metal and ceramic.

* * * * *